Dec. 13, 1966 R. C. GARRISON ET AL 3,290,994
CONTROL SYSTEM FOR MACHINE TOOLS
Filed July 30, 1965 8 Sheets-Sheet 1
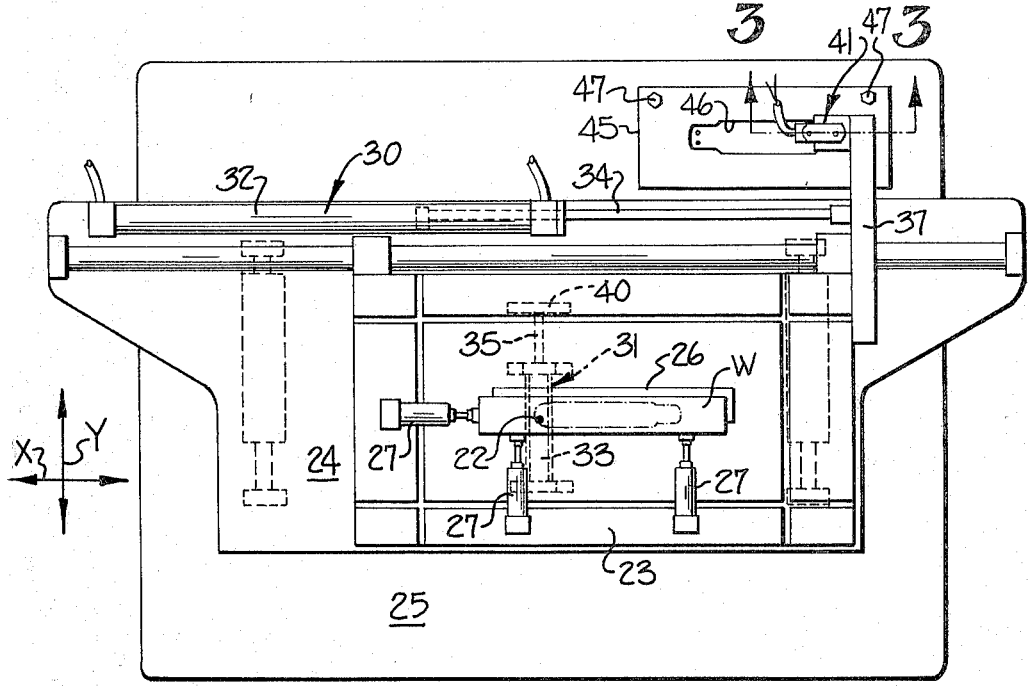
Fig-1
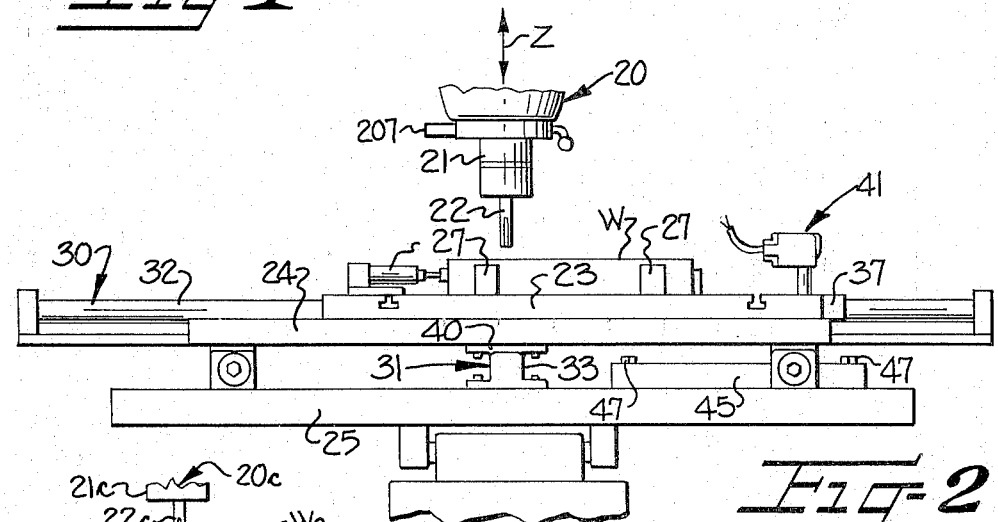
Fig-2
Fig-15
INVENTORS
ROBERT C. GARRISON
and ALLEN M. KNIGHT
BY Parrott, Bell, Seltzer, Park & Heard
ATTORNEYS

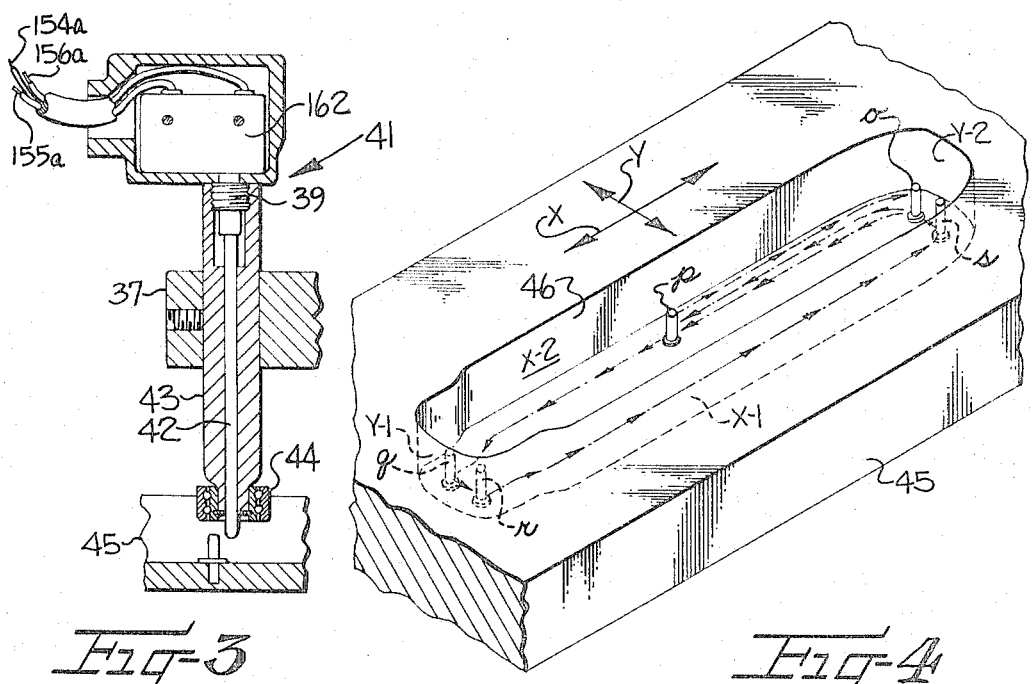
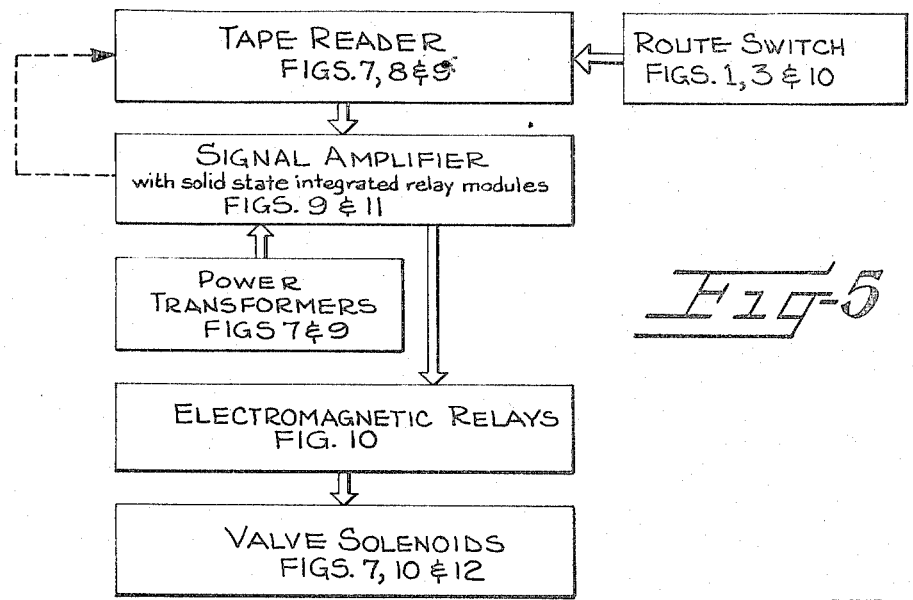

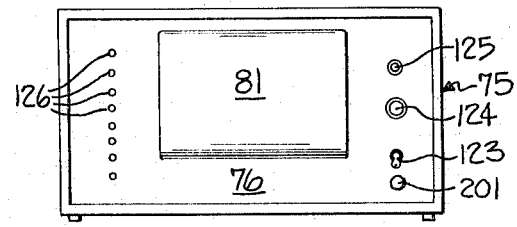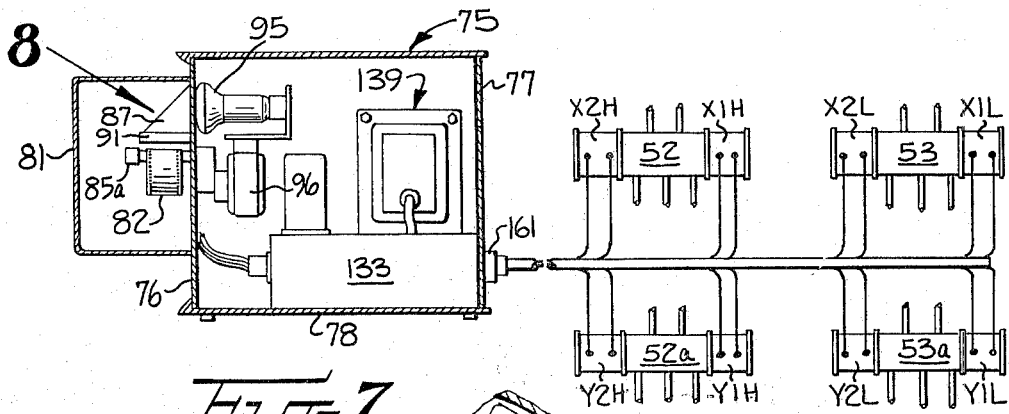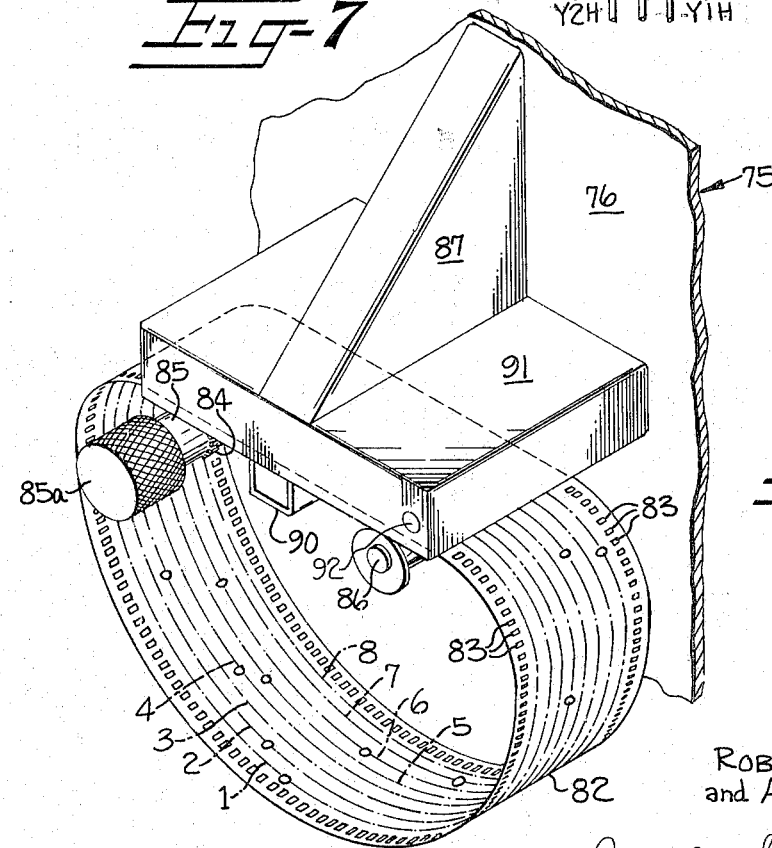

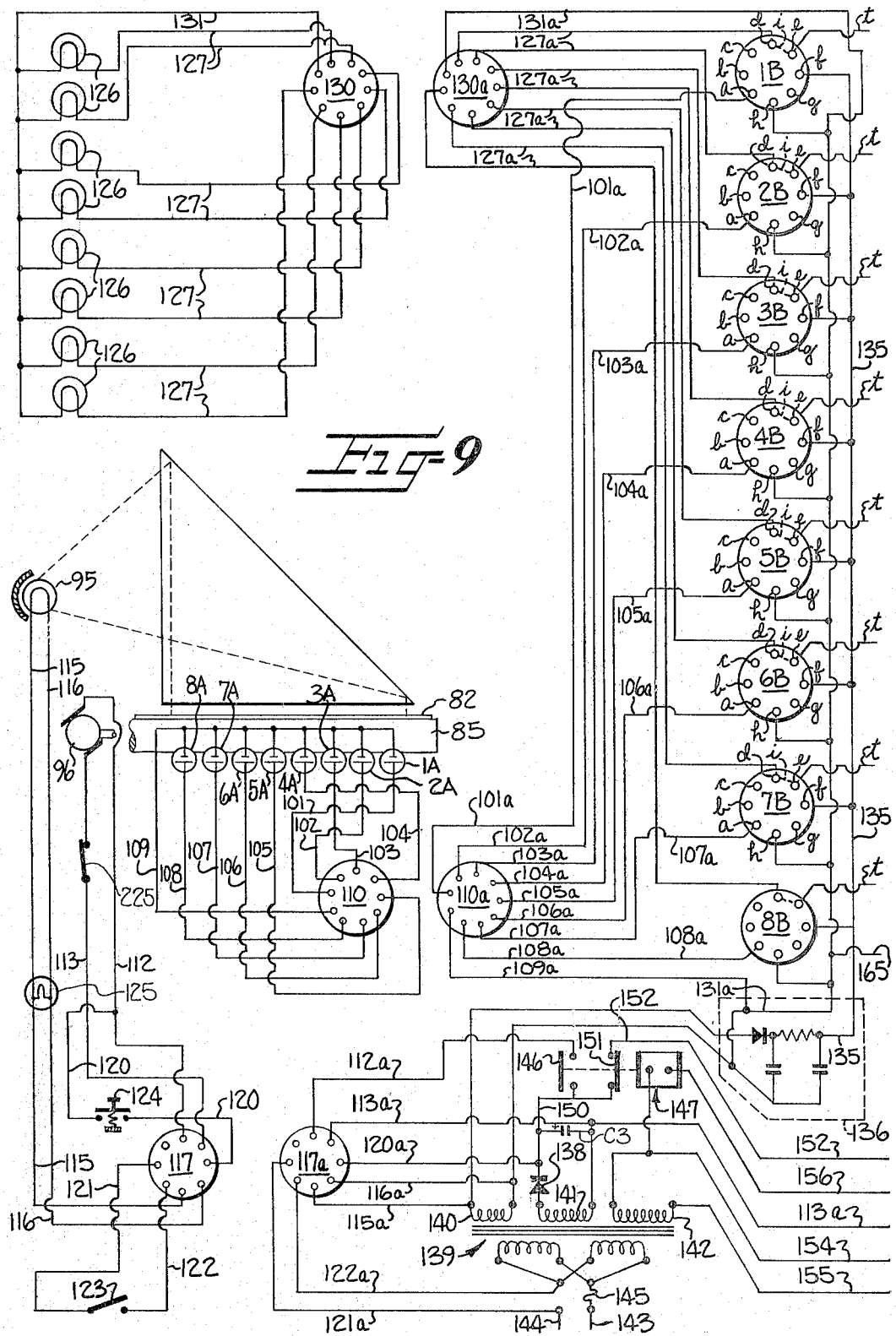

INVENTORS
ROBERT C. GARRISON
and ALLEN M. KNIGHT

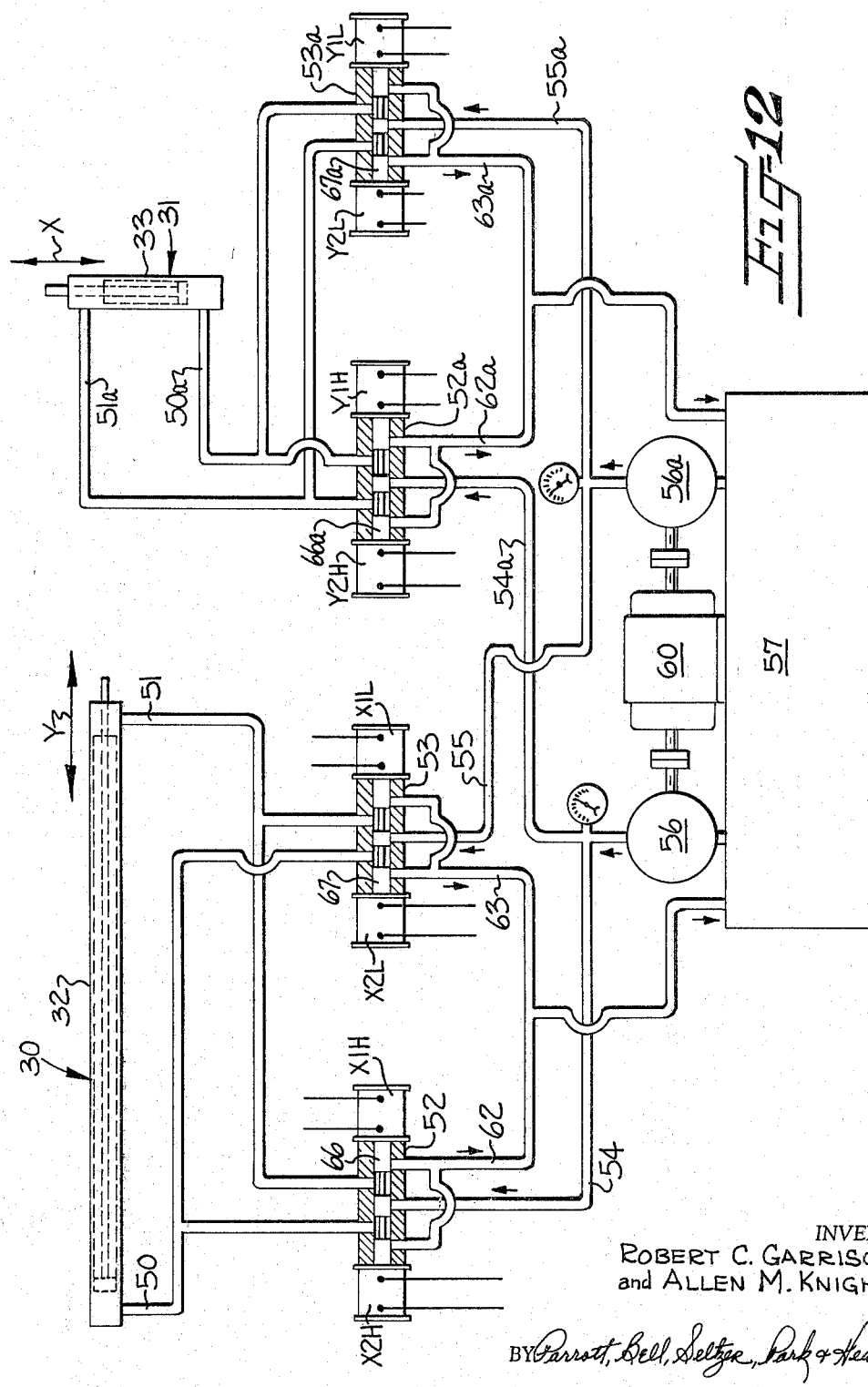

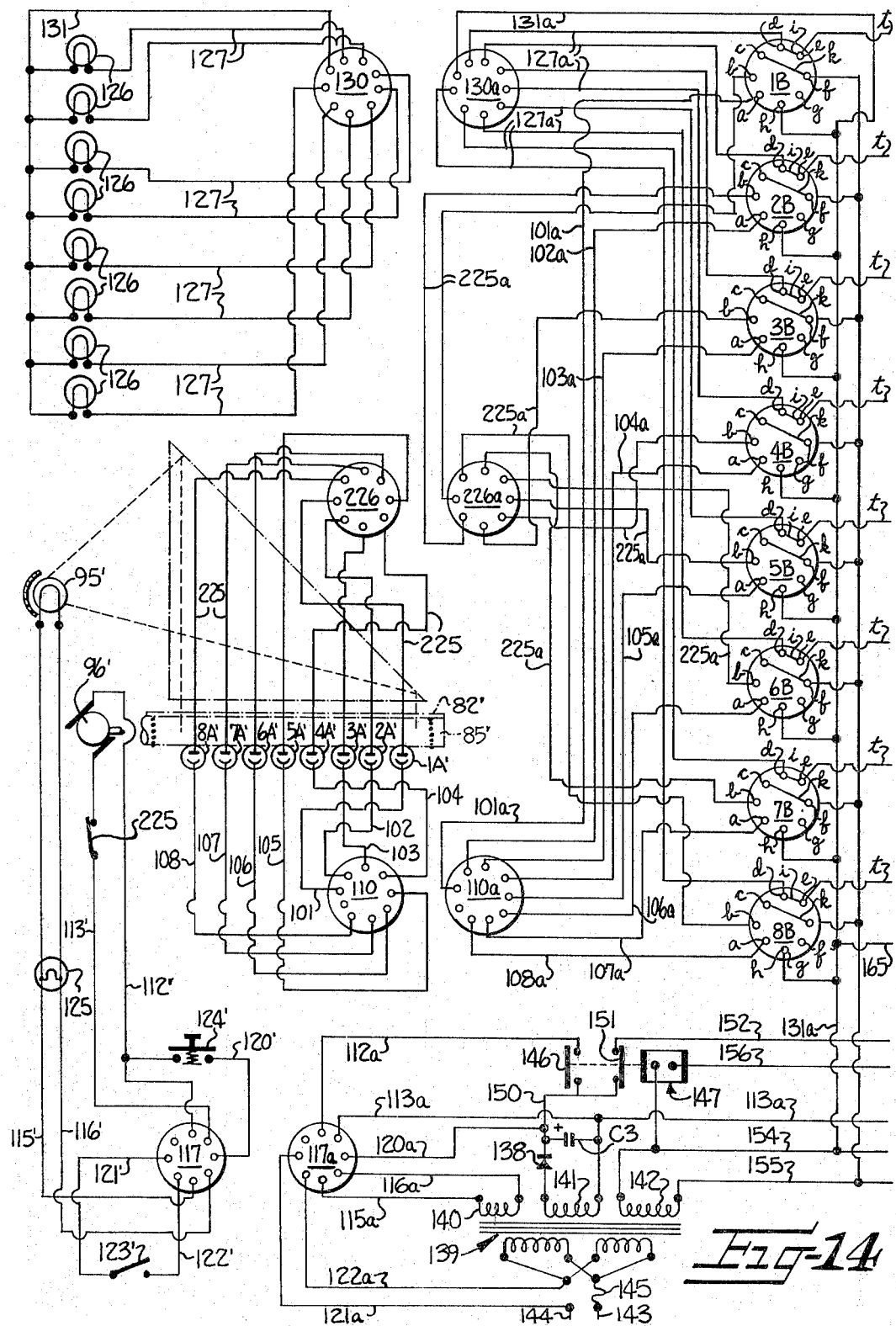

United States Patent Office 3,290,994
Patented Dec. 13, 1966

3,290,994
CONTROL SYSTEM FOR MACHINE TOOLS
Robert C. Garrison and Allen M. Knight, both of Statesville, N.C., assignors to Garrison Machinery Company, Statesville, N.C., a corporation of North Carolina
Filed July 30, 1965, Ser. No. 475,927
24 Claims. (Cl. 90—13.5)

This invention relates to an improved tape control system for controlling the operation of machinery, especially machine tools, such as milling and router machines.

An object of this invention is to provide a simple and effective solid state electrical programming device for transmitting control signals from a pattern tape or strip to electrically controlled drive mechanisms of a machine tool and wherein the advancement of the tape is largely effected as a function of the completion of each stage of operation or operations of the drive mechanisms as called for by the tape.

Another object of this invention is to provide a system for controlling relative irregular movement between a working tool or cutter and a worktable of a machine tool having a stylus and a template mounted for relative movement in fixed proportional relation to the worktable and the working tool, respectively, or to the working tool and the worktable, respectively, and wherein first and second differential force applying means are provided for effecting relative movement between the working tool and the worktable along respective first and second axes on a common plane, with pattern control means responsive to the positioning of the stylus for controlling the amount of force effected by the first and second force applying means such as to maintain interengagement between the stylus and the guiding surfaces of the template under relatively light pressure while causing relative movement between the working tool and a workpiece on the worktable under relatively large force regardless of the direction of relative movement between the same.

In one disclosed embodiment of the invention, the working tool is a cutter and occupies a fixed position, as does the template, and the worktable and stylus are moved synchronously relative to the cutter and the template by first and second fluid motors effective along two respective axes which are about perpendicular to each other in a common plane. Actuator elements are positioned to detect the juncture of abrupt changes in the direction of guide surfaces of the template. The stylus, or an element moving in fixed relation to the stylus, moves successively into registration with successive actuators to effect an advancement of a pattern tape. A tape reader photoelectrically excites solid state circuits corresponding to control zones or perforations in the tape, which circuits transmit signals to electrically operable valves controlling the pressure and direction of force of fluid pressure in the fluid motors so the worktable and template are moved at high pressure parallel to corresponding guide surfaces of the template while the stylus is maintained in contact with such surfaces under relatively low pressure to insure that the worktable follows the exact course prescribed by the template without placing the stylus under undue lateral stresses.

In another embodiment of the invention, the working tool or cutter and the stylus are disposed in axial alignment with each other and the template is attached to and moves with the worktable and the workpiece supported thereon. In other words, instead of the worktable and stylus being moved synchronously as described with respect to the embodiment previously described, the worktable and the template are moved synchronously and the cutter and the stylus occupy fixed positions.

Some of the objects of the invention having been stated, other objects will appear as the description proceeds, when taken in connection with the accompanying drawings, in which—

FIGURE 1 is a top plan view of the movable worktable of a machine tool, embodied in a router machine, showing a preferred embodiment of some of the elements of the present invention for moving the worktable;

FIGURE 2 is a fragmentary front elevation of the structure shown in FIGURE 1 and showing a vertically movable workhead positioned above the worktable and a workpiece thereon;

FIGURE 3 is an enlarged fragmentary vertical sectional view taken substantially along line 3—3 in FIGURE 1 showing the stylus assembly supported in fixed relation to the worktable and also showing a portion of the template in association therewith;

FIGURE 4 is an enlarged fragmentary perspective view of the template with a representative patterned or profile recess therein and corresponding tape advancing actuators adapted to register with and be engaged by the stylus of FIGURE 3 in succession;

FIGURE 5 is an elementary block diagram of a preferred embodiment of the control system of the present invention;

FIGURE 6 is a front elevation of a housing for the electrical components of the control system;

FIGURE 7 is a vertical sectional view through the housing of FIGURE 6 showing the pattern tape, the tape reader and some of the associated electrical components of the control system therein, with a schematic illustration of electrical controlling elements, embodied in electrically operable fluid flow control valves, in association therewith;

FIGURE 8 is an enlarged fragmentary perspective view of the pattern tape, its supporting means, and the tape reader looking in the general direction of the arrow 8 in FIGURE 7;

FIGURES 9 and 10 are, collectively, one embodiment of a schematic electrical diagram of the control system;

FIGURE 12 is a schematic diagram of the fluid pressure circuit of the control system;

FIGURE 14 is a schematic diagram of an electrical circuit particularly devised to accommodate the second form of solid state integrated relay module shown in FIGURE 13, the circuit of FIGURE 14 being designed to replace the circuit of FIGURE 9 and to be used with the circuit of FIGURE 10;

FIGURE 15 (Sheet 1) is a somewhat schematic fragmentary vertical sectional view showing a modified arrangement in which the working tool and stylus occupy fixed positions and the template and worktable are moved synchronously relative to the working tool and the stylus.

Figure 10:
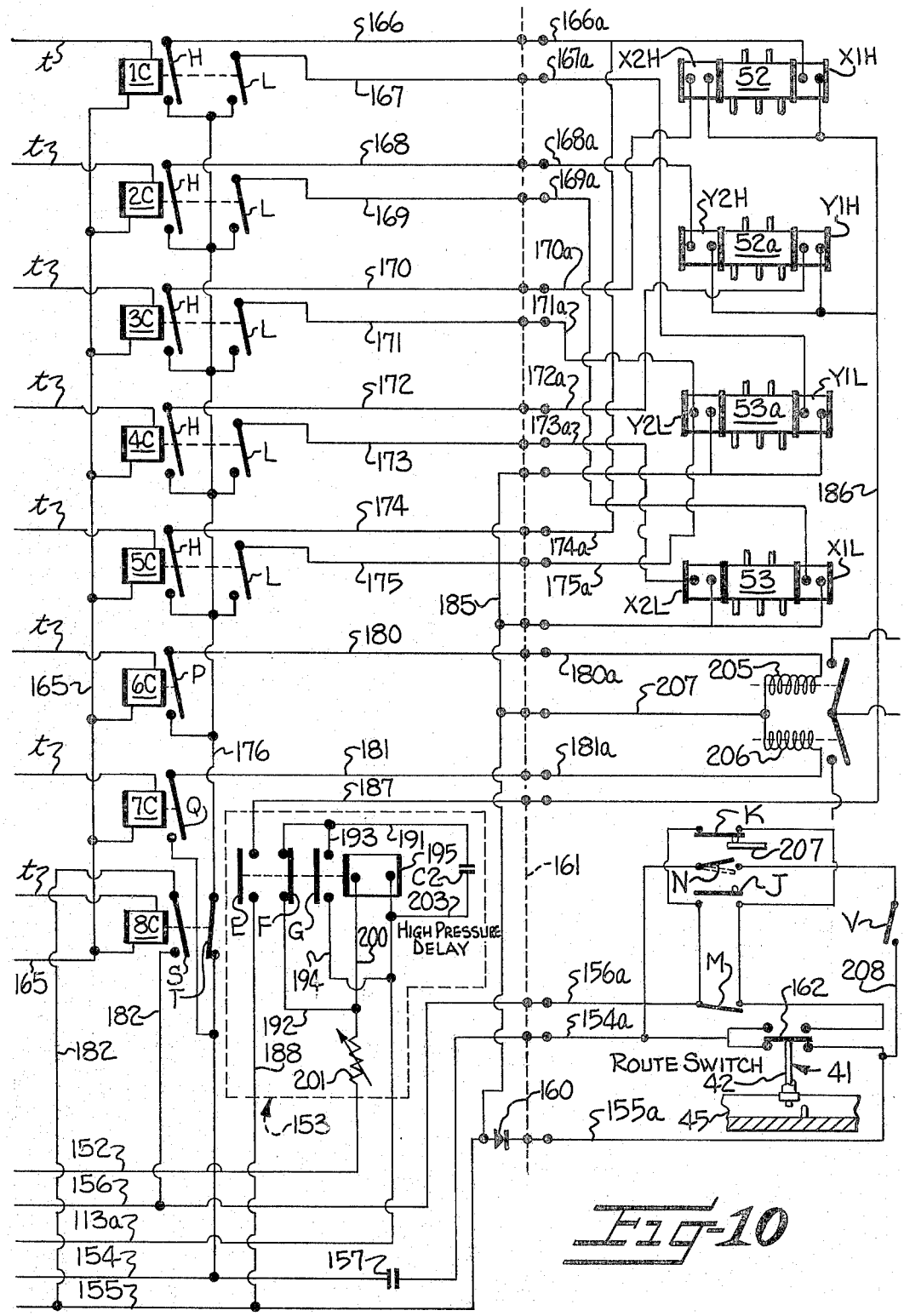

In the illustrated preferred embodiment of the invention, it is shown in association with a router machine for forming regularly or irregularly shaped grooves or apertures therein or edges thereon. It is to be understood however that the invention is applicable to various other machine tools or to any machine or application for which the invention may be useful. Also, although the invention is applied to the control for a worktable movable relative to a fixed or adjustable point, such as the cutter, bit or tool of the machine, and includes a stylus movable relative to a template and in fixed or portional relation to the movement of a worktable for coplanar movement in a horizontal plane with reference to a vertically arranged tool, it is to be understood that the planes of the tool, worktable, stylus and template may be located as desired, and that the table and template may be moved angularly as well as rectilinearly, and that the tool or tools and the template may be moved relative to a fixed worktable or workpiece and a fixed stylus or path tracing element, without departing from the spirit of the invention. As illustrated in the modified embodiment of FIGURE 15, the workpiece, worktable and template are moved relative to a fixed cutter or tool and a fixed stylus.

The machine

Generally, the representative machine tool to which the present invention is applied, as shown in FIGURES 1 and 2, is in the form of a router machine which, with the exception of the novel features to be set forth hereinafter, may be of conventional construction. Therefore, only so much of the router machine is shown as is necessary to a clear understanding of the present invention, it being known that a router machine usually comprises a workhead or toolhead 20 (FIGURE 2) which is usually raised and lowered along a substantially vertical axis "Z" by a double-acting air cylinder or other fluid pressure means and has a driven rotating chuck 21 for supporting a worktool 22, such as a router or other rotary cutting element, for cutting contoured openings in or contoured edges on workpieces.

Such a workpiece is indicated at W and is carried by a universally horizontally movable worktable 23 guided for substantially horizontal movement along an "X" axis on a substantially horizontal frame 24. Frame 24 is guided for movement along a substantially horizontal "Y" axis perpendicular to said "X" axis on a base 25 which may be adjustable so as to be tilted, as is usual in cutting out certain types of workpieces. By way of example, workpiece W is shown in the form of an elongate blank from which the wooden shuttle of a loom may be formed and is clampingly secured against a workholder 26 by conventional clamping members 27 which usually and preferably are in the form of fluid-operated or air cylinders.

Differential or variable force applying means are provided for effecting movement to worktable 23 substantially along said "X" and "Y" axes. In their preferred embodiment, such differential force applying means comprise fluid motors or double-acting cylinders 30, 31 which extend substantially parallel to the respective axes "X" and "Y" and include respective cylinders 32, 33 and pistons rods 34, 35. Fluid motor 30 is carried by movable frame 24 and positioned rearwardly of worktable 23. In this instance, cylinder 32 is suitably secured to frame 24 and piston rod 34 is suitably connected to a bracket or arm 37 which projects rearwardly from and is suitably secured to one side of worktable 23. Cylinder 33 is positioned between worktable 23 and base 25 and is suitably secured to base 25. Piston rod 35 is secured to a block 40 projecting downwardly from and being suitably secured to frame 24.

The rear portion of arm 37 has a composite stylus 41 mounted thereon (FIGURES 1, 2 and 3) which includes a substantially vertically disposed stylus rod or detector rod 42 vertically movable in a tubular member 43 and whose enlarged upper end is guided in a threaded sleeve 39 (FIGURE 3) for operating a route switch 162. The lower end of tubular member 43 has a follower 44 thereon in the form of an antifriction bearing. Follower 44 rides against the guiding surfaces or walls of a profile recess or cavity 46 in a template 45. The walls of profile 46 are indicated at X–1, X–2, Y–1, Y–2. In the latter reference characters, the prefix letters correspond to the "X" and "Y" axes and the suffix numerals –1 and –2 indicate that stylus 41 generally moves in opposite directions along the respective surfaces so identified.

Template 45 is suitably removably secured to base 25, as by screws 47 (FIGURE 1).

With the exception of the particular construction of stylus 41, the parts of the router machine, as described to this point, may be conventional, particularly in so-called automatic routing machines. To my knowledge, it has been necessary heretofore to provide substantially the same amount of force acting on the worktable 23 and frame 25 in either direction along both the "X" and "Y" axes at all times. Accordingly, in the operation of the known types of automatic routing machines, whenever the stylus was to move along a guide surface parallel to the "X" axis, for example, the stylus would be urged against the corresponding guiding surface of the template under the same amount of force as that which imparted movement to the worktable along the "X" axis.

This not only placed the stylus under undue stress resulting in consequent relatively rapid fatigue and wear of the parts thereof, but it also required that the force acting parallel to the "X" axis had to absorb the force acting along the "Y" axis, which held the stylus in engagement with the corresponding template guiding surface, in addition to effecting the desired movement of the worktable and its workpiece along the "X" axis. The large forces acting in both axial directions have frequently caused the worktool to gouge undesirable notches in the workpiece, such as at the end of each linear movement thereof preceding a change in direction of movement. It is apparent that a similar situation has existed with each substantial change in direction of movement of the worktable and stylus relative to the working tool and the template.

Valve arrangement

The control system of the present invention controls the application of force to the worktable 23 by fluid motors 30, 31 in such a manner that whenever a large amount of force is applied to worktable 23 and stylus 41 to move the same in either direction along either axis "X" or "Y," a relatively small force is applied to worktable 23 and stylus 41 substantially transversely of the direction of application of the large force. Thus, stylus 41 is maintained in engagement with the corresponding template guiding surface under relatively light pressure. Accordingly, the control system for the present invention includes pattern controlled means for alternatively introducing relatively high and relatively low fluid pressure into each end of each cylinder 32, 33. The fluid pressure circuit (FIGURE 12) will now be described.

The base and head ends of cylinders 32, 33 have corresponding ends of respective conduits 50, 51; 50a, 51a communicatively connected thereto whose other ends are connected to respective pairs of electrically operable control valves 52, 53, 52a, 53a (FIGURES 7, 10 and 12). These valves are illustrated in the form of spool valves in FIGURE 12, but it is to be understood that any type of suitable valve, capable of being electrically controlled, may be used.

Valves 52, 53, 52a, 53a have respective input or feed conduits 54, 55, 54a, 55a connected thereto. Conduits 54, 54a are communicatively interconnected and are connected to a source of relatively high pressure 56. Conduits 55, 55a are communicatively interconnected and also connected to a source of relatively low pressure 56a. In this instance, hydraulic fluid is preferably used for operating fluid motors 30, 31 and, therefore, the sources of high and low pressure are in the form of separate hydraulic pumps which pump fluid from a suitable reservoir 57 and are driven by any suitable means such as an electric motor 60. Return lines or conduits 62, 63, 62a, 63a also communicatively connect corresponding return ports of the respective valves 52, 53, 52a, 53a to reservoir 57. Branch conduits 64, 65, 64a, 65a connect the respective conduits 62, 63, 62a, 63a to other return ports of valves 52, 53, 52a, 53a.

The spools or cores 66, 67, 66a, 67a of the respective valves 52, 53, 52a, 53a may be of a type which normally occupy neutral positions in which the valves are closed; i.e., there is no flow of fluid through the valves. Solenoids X1H, X2H; X1L, X2L; Y1H, Y2H; and Y1L, Y2L are suitably connected to opposite ends of the respective spools 66, 67, 66a, 67a and the fluid conduits are so arranged that energization of one of the solenoids of each pair causes fluid to flow into one end of the corresponding cylinder while being exhausted from the other end thereof, and energization of the other solenoid of the corresponding pair causes fluid to flow into the other end of the corresponding cylinder and out of the first-mentioned end of the corresponding cylinder. It is apparent, by referring to FIGURE 12, that relatively high fluid pressure and relatively low fluid pressure may be introduced alternatively into either end of each cylinder and exhausted from the other end of the corresponding cylinder by selectively controlling operation of the solenoids.

A preferred embodiment of the programming device for effecting predetermined successive cycles in the operation of the machine-controlling elements embodied in the solenoids of FIGURE 12, for example, will now be described.

Programming device

As indicated in the block diagram of FIGURE 5, the programming device of the control system includes a tape reader which produces electrical signals or pulses which are amplified by a signal amplifier, the tape reader and the signal amplifier receiving current from power transformers, and the amplified signals being used for controlling electromagnetic relays which, in turn, control the operation of the valve solenoids of FIGURE 12. The tape reader reads pattern control zones or perforations along a pattern strip or tape 82 to which stepwise advancement is effected, in most instances, by route switch 162 operated by the stylus 41, but wherein the advancement of the pattern tape is also effected, at times, by the signal amplifier and, at still other times, the advancement of the pattern tape may be effected manually, particularly in initiating a cycle of the programming device.

As shown in FIGURE 6, the electrical components of the programming device may be positioned in a suitable housing 75 which may be located adjacent to or remote from the machine or machines to be controlled thereby. Housing 75 may be of rectilinear shape and includes top, bottom, front, rear and opposed side walls, the front and rear walls being indicated at 76, 77 and the bottom wall being indicated at 78. The front wall 76 has a suitable cover 81 removably or hingedly mounted thereon facilitating access to the endless pattern tape or strip 82 which conveninetly may be made from a 35 millimeter plastic strip such as is used in cameras and has longitudinal rows of equally spaced openings 83 along its length adjacent opposite side edges thereof for engagement with corresponding cog wheels 84 on a drive shaft 85 (FIGURE 8). Only one of the cog wheels 84 is shown in this instance.

In this embodiment, pattern tape 82 has eight longitudinally extending channels or rows of control zones therein indicated at 1–8 and which are shown in the form of openings or perforations through the tape 82 and which may be arranged in any desired order according to the desired cycle of the elements to be controlled thereby. The illustrated arrangement of the perforations 1–8 in FIGURE 8 does not necessarily indicate a particular arrangement of perforations which would be employed for producing the desired sequence of operation of the solenoid valves 52, 53, 52a, 53a. Pattern tape 82 also extends over a roller or rod 86 and between a prismatic light deflector or mirror 87 and a photocell assembly 90, the latter being the essential component of the aforementioned tape reader.

The rod 86 and photocell assembly 90 may be suitably secured to front wall 76 of housing 75. Wall 76 also has a rectangular block 91 suitably supported thereon, as by a pivot pin 92. Block 91 extends outwardly from wall 76 so it overlies the upper run of pattern tape 82. Block 91 may be transparent or it may have a suitable opening therein corresponding to the mirror or light deflector 87 supported thereby so as to permit light to pass through any openings in the tape which register therewith to excite corresponding silicon read-out photocells 1A–8A of the photo-voltaic type carried by the photocell assembly 90. As is known, a photo-voltaic cell generates a low voltage without an outside source of power when exposed to sufficient light.

Preferably, the photocell assembly 90 may be of a type substantially as disclosed in U.S. Patent No. 3,042,806, issued to Marvin Lubin on July 3, 1962, and includes light-sensitive plates therein, as shown in said patent, serving as the photocells 1A–8A (FIGURE 9). An incandescent lamp 95 may serve as the source of light for photocell assembly 90 and is shown in FIGURE 7 as being suitably supported within housing 75. The front wall 76 has a suitable opening therein or may have a transparent portion thereon through which the light from the lamp 95 passes to be deflected downwardly toward photocell assembly 90 by deflector 87.

Suitably supported within housing 75 and beneath lamp 95 is a suitable electrically operable device 96 connected to shaft 85 (FIGURE 8) for imparting stepwise rotation thereto. The device 96 may be in the form of a solenoid operated stepping motor or ratchet mechanism of well-known construction and, accordingly, a detailed illustration and description thereof is deemed unnecessary. It should be noted, however, that motor 96 should be of a type which will impart one step in movement to shaft 85 and tape 82 each time motor 96 is energized.

Electrical circuit (tape reader)

Referring to the left-hand lower portion of FIGURE 9, it will be observed that corresponding sides of photocells 1A–8A have respective conductors 101–108 connecting the same to corresponding terminals of an electrical connector or cannon plug 110, another terminal of which is connected to the other sides of the photocells by a common conductor 109. Stepping motor 96 and lamp 95 have respective pairs of conductors 112, 113; 115, 116 connected thereto which extend to separate terminals of an electrical connector or cannon plug 117, other terminals of which have corresponding conductors 120, 121, 122 connected thereto. Conductors 121, 122 are connected to opposite sides of a manual master switch 123. A pilot lamp 125 is connected across conductors 115, 116, and a normally open manual tape advancing push-button switch 124 is interposed in conductor 120.

The knurled knob 85a on shaft 85 (FIGURE 8) is provided to facilitate threading pattern tape 82 through the tape advancing and supporting means heretofore described. The switches 123, 124 and pilot lamp 125 may be mounted on the front wall 76 of housing 75 as shown in FIGURE 6.

As a visual indication of operation of any of the valve-operating solenoids shown in FIGURE 12, a set of eight incandescent or other type electric lamps 126 may be mounted on front wall 76 of housing 75 as shown in FIGURE 6. Referring to the upper left-hand portion of FIGURE 9, it will be observed that each lamp 126 has a conductor 127 extending therefrom to a corresponding terminal of an electrical connector or cannon plug 130, another of which terminal has a common conductor 131 extending therefrom to the other sides of lamps 126.

Signal amplifier

The cannon plugs 110, 117, 130 are adapted to be plugged into respective electrical receptacles or connectors 110a, 117a, 130a which may be mounted in the front wall of a suitable chassis 133 (FIGURE 7) in housing 75. When plug 110 is connected to receptacle 110a, this connects conductors 101–109 to respective conductors 101a–109a. When plug 117 is connected to receptacle 117a, this connects conductors 112, 113, 115, 116, 121, 122 to respective conductors 112a, 113a, 115a, 116a, 121a, 122a. When plug 130 is connected to receptacle 130a, this connects each conductor 127 to a corresponding conductor 127a while connecting conductor 131 to a conductor 131a.

For purposes of high efficiency in operating the solenoids of valves 52, 53, 52a, 53a, the control system is provided with novel solid state integrated relay modules which respond to the corresponding photocells 1A–8A to provide the required voltage and current, properly limited and free from transients, to activate the corresponding valve solenoids, preferably through the medium of electromagnetic relays. To accommodate the solid state integrated relay modules, to be later described, eight receptacles 1B–8B, corresponding to the eight photocells 1A–8A, are shown in the right-hand portion of FIGURE 9, these receptacles preferably being arranged in a row in chassis 133 of FIGURE 7.

Each receptacle 1B–8B, as illustrated, may include eight terminals a–h. In this embodiment, terminals b, c, g are not used. Terminals d, e of each receptacle 1B–8B are interconnected by a jumper wire or conductor i. Conductors 101a–108a are connected to terminals a of the respective receptacles 1B–8B, each conductor 127a is connected to a corresponding terminal d, and the conductor 131a is common to all the terminals h of receptacles 1B–8B. A conductor 135 is common to all the terminals f.

Power supply

The ends of conductors 131a, 135 remote from connector 130a and receptacles 1A–8A, respectively, are connected to the output of a suitable low voltage A.C.–D.C. power converter 136 whose input is connected to opposed sides of a low voltage secondary winding 140 of a power transformer 139 which may be mounted upon the chassis 133 as shown in FIGURE 7. Conductor 109a is connected to conductor 131a. Transformer 139 also includes an intermediate secondary winding 141 and a high voltage secondary winding 142. One leg of winding 141 has a rectifier 138 therein, and a filter capacitor C3 also is connected across winding 141. In this embodiment, windings 140, 141, 142 may have an output of 6.3, 48 and 110 volts, respectively, for example. Converter 136 may serve to convert the power of winding 140 from 6.3 volts A.C. to 9 volts D.C., for example, to drive the solid state integrated relays carried by receptacles 1B–8B.

Conductors 115a, 116a from receptacle 117a are connected to opposite sides of low voltage winding 140, and conductors 113a, 120a, are connected to opposed sides of intermediate voltage winding 141. Conductor 113a also extends to a high pressure controlling delay relay 153 to be later described. In this instance, the primary of transformer 139 includes two windings so it may be connected to either a 110 or a 220 volt supply source, for example. The primary of transformer 139 is connected to a lead conductor 143, by means of a suitable fuse 145, and to conductor 122a extending from receptacle 117a. Conductor 121a is connected to another lead conductor 144. It is apparent, therefore, that master switch 123 must be closed in order to energize the primary of transformer 139.

Conductor 112a in the lower central portion of FIGURE 9 extends from receptacle 117a to one side of a normally open automatic tape-advancing switch 146 of a relay 147. The other side of switch 146 is connected to a conductor 150 leading to the rectified side of intermediate secondary winding 141. Relay 147 also includes a normally closed delay trigger switch 151 which, when closed, connects conductor 150 to a conductor 152 leading to the high pressure time-delay-relay or relay mechanism 153 to be later described.

The high voltage secondary winding 142 of transformer 139 has conductors 154, 155 connected to opposite ends thereof, and one end of the coil of tape advancing relay 147 is connected to conductor 154. The other end of the latter coil has a conductor 156 connected thereto.

The conductors 154, 155 have a condenser 157 (FIGURE 10) and a rectifier 160, respectively, interposed therein. Conductors 154, 155, 156 are connected to respective conductors 154a, 155a, 156a through a terminal strip, cannon plug or connector 161 suitably secured to the rear wall 77 of housing 75 (FIGURE 7). Connector 161 is shown as a dotted line in the central portion of FIGURE 10.

Conductors 154a, 155a are connected to opposed sides of the normally closed lower portion of a double-throw route switch 162, which is a part of stylus 41 (FIGURE 3) and the housing of which is fixed on the upper end of tubular member 43 so as to be operated by rod 42 and a series of tape advancing actuators or pins o–s (FIGURES 1, 3 and 4), for example, carried by template 45. The rod 43 of stylus 41 moves into engagement with and is raised by successive actuators o–s, as will be more fully described hereinafter.

As illustrated in FIGURE 4, actuators o–s are fixed in and project upwardly from the bottom of the cavity 46 in template 45, there being one of these actuators positioned at least adjacent each juncture of adjacent guiding surfaces or side walls of cavity 46 which have a substantial change in direction. Since stylus rod 42 is illustrated in FIGURE 3 as being positioned concentrically with follower 44, it is apparent that actuators o–s are spaced from the walls of contoured cavity 46 so as to be successively engaged by lower end of stylus rod 42 to impart upward movement thereto to establish contact between conductors 154a, 156a (FIGURE 10) at the normally opened portion of route switch 162 while breaking contact between conductors 154a, 155a. Although five route switch actuators are shown in FIGURE 4, it is to be understood that the number of such actuators will vary in accordance with variations in the configuration of the pattern in template 45.

It is apparent that the template may be arranged to move with the worktable or workpiece and stylus 41 may be fixed with respect to the axis of cutter 22. Such an arrangement is shown schematically in FIGURE 15 and will be later described.

When route switch 162 occupies its normally lowered position (FIGURE 10), it charges condenser 157 so that, each time route switch 162 is raised to establish contact between conductors 154a, 156a, condenser 157 discharges through relay 147 (FIGURE 9) to momentarily close switch 146 and open switch 151, thereby advancing pattern tape 82 one step and momentarily breaking the circuit to delay mechanism 153.

Although a preferred arrangement of the stylus assembly 41 and actuators o–s has been described, it is to be understood that any suitable means may be used for effecting a step in advancement of tape 82 each time the follower 44 occupies each successive position as represented by actuators o–s. For example, a photocell means, responsive to successive opaque or light reflective areas or light sources on the template 45, may be employed in place of stylus rod 42.

Electromagnetic relays and valve connections

Referring again to FIGURE 9, it will be observed that the terminal e of each relay module receptacle 1B–8B has a corresponding conductor t leading therefrom to one end of the coil of a corresponding low-voltage electromagnetic valve-solenoid-operating relay, there being eight such relays shown, indicated at 1C–8C, in the left-hand portion of FIGURE 10. The other side of each coil of relays 1C–8C is connected to a common conductor 165 which is, in turn, connected to the conductor 131a (FIG- URE 9) and, thus is common to all the terminals h of the receptacles 1B–8B.

Each relay 1C–5C (FIGURE 10) includes a pair of normally open switches H, L which, when closed, effect energization of corresponding high pressure and low pressure solenoids of valves 52, 53, 52a, 53a. Accordingly, conductors 166–175 are connected in parallel to one side of switches H, L of the respective relays 1C–5C and the other sides of switches H, L are connected to a common conductor 176 extending to conductor 154 between high voltage winding 142 (FIGURE 9) and condenser (FIGURE 10).

The relays 6C, 7C also have respective normally open switches P, Q, corresponding sides of which are connected to conductor 176 and the other sides of which are connected to respective conductors 180, 181. Relay 8C, operated by photocell 8A and the solid state relay connected to receptacle 8B, serves automatically to advance pattern tape 82 to a "home" position following each cycle of the machine tool. Thus, relay 8C includes a normally open switch S and a normally closed switch T. Switch T is interposed in conductor 176 between switches H, L, P and conductor 154. Switch S is interposed in a conductor 182 whose opposite ends are connected to conductors 155, 156.

Through connecter 161, conductors 166–175, 180, 181 are connected to respective conductors 166a–175a, 180a, 181a, (FIGURE 10). Conductors 166a–173a are connected to corresponding sides of the respective valve solenoids X1H, Y1L, Y2H, X1L, X2H, Y2L, Y1H, X2L. Conductors 174a, 175a are also connected to the same sides of solenoids X1H, Y2L as that to which the conductors 166a, 171a are connected. The other sides of all the low pressure solenoids X1L, X2L, Y1L, Y2L are connected through terminal strip 161 to a common conductor 185 leading to a portion of conductor 155 located between high voltage transformer 142 (FIGURE 9) and rectifier 160.

Whenever pattern tape 82 initiates a pulse, other than that pulse effected at the start of each machine cycle, which calls for operation of any one or more of the then inactive relays 1C–5C, it is quite important that the corresponding low pressure valve solenoid associated therewith is activated for a sufficient interval, prior to the corresponding high pressure valve solenoid being operated, to insure that follower 44 (FIGURE 3) is firmly in engagement with the corresponding guiding surface of the template 45 before follower 41 is moved in a path parallel to that guiding surface against which it is being forced, as corresponding movement is imparted to worktable 23 and workpiece W. This insures that workpiece W and template 45 are properly positioned before cutting commences corresponding to a change in direction in the guide surfaces of the template 45. Therefore, the sides of the high pressure valve solenoids X1H, X2H, Y1H, Y2H opposite from conductors 166a, 170a, 172a, 168a are connected to the aforementioned high pressure delay mechanism 153 by means of a common conductor 186 which is connected to a conductor 187 at the connector 161.

*High pressure delay mechanism*

Delay mechanism 153 comprises two normally open switches E, G and a normally closed switch F, which when closed, establish contact between respective pairs of conductors 187, 188; 191, 192; 193, 194. Switches E, F, G are parts of an electromagnetic relay 195 to one end of the coil of which conductor 113a (from transformer secondary 48) is connected, and to the other end of which a conductor 200 is connected.

Corresponding ends of conductors 152, 200 are connected to opposite ends of a variable resistor 201, and the ends of conductors 188, 192, 194, 193 opposite from the switches E, F, G are connected to the respective conductors 155, 200, 113a, 191. The end of conductor 191 remote from switch F is connected to one side of a condenser C2, the other side of which has a conductor 203 leading therefrom to conductor 113a.

As will be later explained more in detail, each time stylus 41 rides onto any one of the pins o–s (FIGURES 4 and 10) of template 45, tape advancing relay 147 is energized momentarily to impart an advancing step to tape 82 through switch 146 (FIGURE 9) as switch 151 breaks the circuit to the coil of relay 195 of delay mechanism 153 (FIGURE 10), permitting switches E, G to open and switch F to close. Now, assuming that tape 82 selects operation of any one or more of the electromagnetic relays 1C–8C, although stylus 41 remains elevated by a pin, tape advancing relay 147 remains energized only for a very short interval so that switch 151 returns to closed position and starts operation of delay mechanism 153, as follows:

Current flows from one side of intermediate secondary winding 147 (FIGURE 9) through rectifier-filter 138, C3, conductors 150, 152 and relay switch 151, through variable resistor 201, conductor 200, relay 195 and conductor 113a to the other side of secondary winding 141. However, the magnitude of the current flowing through relay 195 is, initially, insufficient to move the armature of relay 195 because condenser C2 is, in effect, robbing the current which would otherwise be flowing through relay 195 at a rate determined by the adjustment of the variable resistor 201, as current flows from conductor 200 through conductor 192, switch F, conductor 191, condenser C2 and conductor 203 to conductor 113a.

However, upon condenser C2 becoming sufficiently charged, its delay function is completed as current at full potential flows through the coil of relay 195 and thus opens switch F while closing switches E, G. In so doing, the corresponding high pressure solenoid or solenoids are energized, whereas the corresponding low pressure solenoids will have been previously energized substantially simultaneously with the advancement of tape 82. Also, the closing of switch G of delay mechanism 153 closes a circuit across condenser C2 so that it becomes fully discharged preparatory to the next cycle in operation thereof.

It should be noted that switch 151 of tape advancing relay 147 remains closed, so that current continues to flow through the coil of relay 195 of delay mechanism 153 until stylus 41 engages and is again elevated by a control pin of template 45. In other words, the circuit to any previously activated high pressure valve solenoid is maintained until the particular function thereof is completed and another change in direction of the guiding surfaces of template 45 is encountered by stylus 41.

As is well known, the tool carrying heads of many different types of machines are provided with means for raising and lowering the same. For example, most routing machines are equipped with electrically controlled pneumatic means for selectively lowering and raising the router head or tool-carrying head 20 (FIGURE 2) thereof. Accordingly, no attempt will be made herein to disclose the conventional mechanism for raising and lowering the tool-carrying head 20. However, it will be observed in the right-hand central portion of FIGURE 10 that two conventional head-operating latching relays 205, 206 are provided, relay 205 being representative of any suitable electrically operable means for effecting downward movement of the head 20, and relay 206 being representative of any suitable electrically operable means for effecting upward movement of the head 20. In operation, any time either relay 205, 206 is momentarily energized, the switch thereof remains closed thereafter until the other relay is momentarily energized. Accordingly, conductors 180a, 181a are connected to the outer ends of coils 205, 206 in FIGURE 10 and the other ends of coils 205, 206 are connected to a common conductor 207 connected to conductor 185 through the medium of connector 161. It is apparent that coils 205, 206 are energized alternatively upon alternative energization of the coils of relays 6C, 7C.

The electrical circuit as thus far described with respect to FIGURES 9 and 10 is so arranged that the workhead 20 (FIGURE 2) initially moves downwardly at the start of each cycle at the same time worktable 23 starts its first movement so the cutter 22 gradually moves into the workpiece during relative horizontal movement therebetween, as is desirable in cutting relatively thick workpieces. However, it is sometimes desirable to move the workhead 20 to its predetermined lowermost position before the workpiece W and worktable 23 commence movement, as in the face-milling of portions of castings, for example, in which it is not necessary for the cutter or cutter element 22 to enter the workpiece to any substantial extent. Therefore, an optionally operable circuit arrangement is shown in the lower right-hand portion of FIGURE 10 which is operable to delay operation of the fluid motors 30, 31 upon initiation of each cycle of the apparatus until workhead 20 has reached its lowermost position.

To this end, it will be observed in FIGURE 10 that a switch-engaging member 207, projecting laterally from the vertically movable workhead 20, is movable between a pair of normally open limit switches J, K which are closed by the switch-engaging member 207 when the workhead 20 occupies its respective lowermost and uppermost positions, these switches being in parallel with a manually operable switch M interposed in conductor 156a. Switch M is closed whenever the operation of the fluid motors 30, 31 is not to be delayed in the initiation of each cycle in the operation of the apparatus.

In order to charge condenser 157 whenever the latter delay is required, a normally open momentary contact switch N may be provided between switches K and J and is momentarily closed and then opens by engagement of switch-engaging member 207 therewith in the course of each vertical movement thereof. Switch N is interposed in a conductor 208 whose opposed ends are connected to conductors 154a, 155a and which also has a manually operable switch V interposed therein. Switch V occupies open position whenever the switch M occupies closed position and simultaneous initial operation of the workhead lowering means and the fluid motors 30, 31 is desired.

*Solid state integrated relay module*

Figure 11:
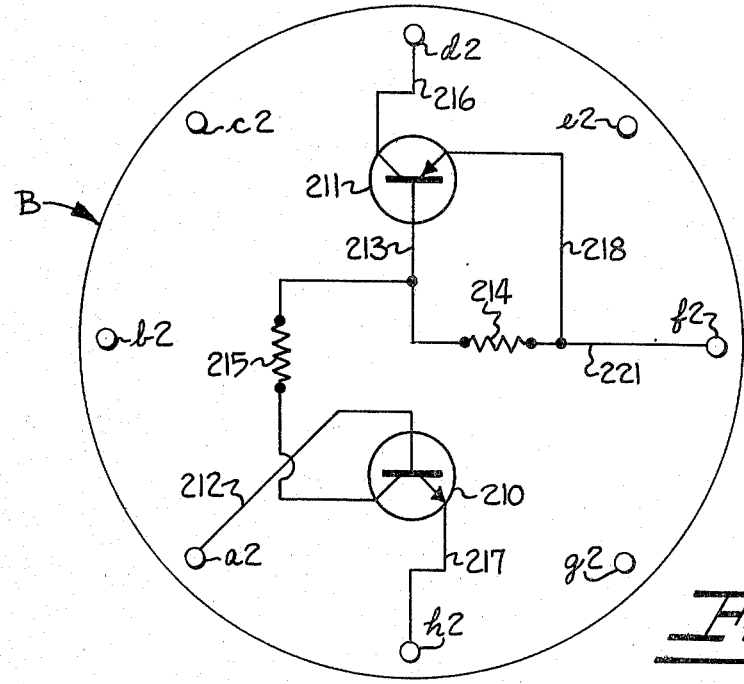
FIGURE 11 is a schematic illustration of one form of solid state integrated relay module for use with each of the receptacles or electrical connectors shown in the right-hand portion of FIGURE 9.

The preferred type of solid state integrated relay module, and for which the portion of the electrical circuit shown in FIGURE 9 is particularly devised, is broadly designated at B in FIGURE 11. The eight pins or terminals of relay module B are indicated at a2, b2, c2, d2, e2, f2, g2 and h2 and are arranged to correspond with the respective terminals a–h of each receptacle 1B–8B in the right-hand portion of FIGURE 9, it being understood that a separate module B is to be plugged into each receptacle 1B–8B.

Since relay module B is designed to maintain a solid state or steady flow of current through each unit of the circuit as called for by the tape reader, relay module B of FIGURE 11 is devoid of vacuum tubes and comprises a pair of transistors 210, 211 the bases of which have respective conductors 212, 213 connected thereto whose other ends are connected to the terminal a2 and a resistor 214, respectively. A resistor 215 also connects the base of transistor 211 to the collector of transistor 210.

The collector of transistor 211 is connected to terminal d2 by a conductor 216 and the emitters of the transistors 210, 211 have respective conductors 217, 218 leading therefrom. Conductor 217 is connected to terminal h2 and conductor 218 is connected to the end of resistor 214 opposite from conductor 213 and has a conductor 221 leading therefrom to terminal f2. Terminals b2, c2, e2 and g2 do not have any conductors connected thereto in the first embodiment of the invention.

*Method of operation of first embodiment with simultaneous initial operation of worktable and workhead*

The method of operation of the first embodiment of the invention will be given with reference to cutting out an opening or cavity in a workpiece W corresponding to the particular shape of the patterned opening or cavity 46 of template 45 as shown in FIGURES 1 and 4, for example. However, it is to be understood that cavities of many different shapes may be formed in different workpieces and/or different irregularly contoured edges may be formed on different workpieces by substituting appropriately designed templates for template 45. Further, as stated heretofore, the machine may be so arranged that the template moves in fixed relation with the workpiece while the positions of the cutter 22 and stylus 41 or equivalents thereof remain fixed, or so that the workpiece and the template remain in fixed positions while the cutter 22 and stylus 41 are moved relative to the workpiece and the template.

In setting up the machine and control system, the stylus 41 should be positioned at a particular starting point with respect to template 45, which starting point is, in this instance, that in which stylus rod 42 is resting upon pin o with follower 44 in firm engagement with guide surface X–2 (FIGURE 4), this being the position that stylus 41 will occupy at the beginning and end of each cycle of the machine and the control system. When stylus 41 occupies this starting position, it should be noted that route switch 162 (FIGURE 10) occupies raised position establishing contact between conductors 154a, 156a.

To facilitate setting up the machine and the control system, suitable manually operable switches, not shown, may be arranged in parallel circuits for connecting each valve-operating solenoid X1L, X2L, Y1L, Y2L to a source of current, such as secondary winding 142, which manually operable switches will remain open during normal operation of the machine and control system. Further, a manually operable switch 225 (FIGURE 9) may be interposed in conductor 113 and may be opened during the setting-up of the machine and the control system so as to render the control circuit inoperative until the setting-up of the machine and control system has been completed. Switch 225 remains closed, however, throughout normal operation of the apparatus.

Before initiating each cycle in the operation of the control system, pattern tape 82 (FIGURES 7, 8 and 9) occupies a "home" position with no perforations 1–8 therein registering with any of the photocells 1A–8A. It is to be assumed that one of the solid state integrated relays B (FIGURE 11) is connected to each of the receptacles 1B–8B of FIGURE 9, that the cannon plugs 110, 117, 113 are connected to respective receptacles 110a, 117a, 113a that cutter 22 is rotating, motor 60 (FIGURE 12) is driving the fluid pressure pumps 56, 56a, and master switch 123 is closed. In this instance, it will also be assumed that the lowering of workhead 20 and initial operation of worktable 23 are to occur substantially simultaneously. Thus, switches M and Q (FIGURE 10) will be closed and opened, respectively, so the operation of switches J, K, N will not normally affect the operation of the apparatus.

To start each cycle in the operation of the apparatus, the manual tape advancing switch 124 is closed momentarily, causing current to flow from intermediate secondary winding 141 (FIGURE 9) through solenoid motor 96, thus advancing pattern tape 82 one step. It should be noted that relay 147 is not operated in this instance so the coil of relay 195 of delay mechanism 153 (FIGURE 10) remains energized. Relay 195 was energized when master switch 123 was closed and the delay in its operation will have transpired by the time manual tape advancing switch 124 is closed. The delay function of delay mechanism 153, for delaying operation of any high pressure valve solenoids is not required at the start of each cycle, because stylus 41 will have already been properly positioned.

On the first step in advancement of pattern tape 82, a hole or perforation 3 and a perforation 6 in tape 82 register with photocells 3A, 6A, causing the same to generate their own voltage in response to illumination thereof effected by lamp 95. Since one side of photocell 3A is connected to terminal $a$ of receptacle 3B, and the other side of photocell 3A is connected to terminal $h$ of receptacle 3B, the base of transistor 210 (FIGURE 11) of the corresponding relay B is biased to cause the same to conduct between the collector and emitter of transistor 210.

In so doing, transistor 210 drops the voltage on the base of transistor 211 (across resistor 214), thereby causing transistor 211 to conduct so current flows from one side of converter 136 through pin $f2$ (FIGURE 11) and transistor 211 to the pin $d2$. Since terminals $d$, $e$ are interconnected by conductor $i$ on each receptacle, it follows that the corresponding lamp 126 is energized as current flows from terminal $d$ of receptacle 3B through conductors 127a, 127 through the corresponding lamp 126, through conductors 131, 131a to energize the corresponding signal lamp 126. At the same time, current flows from terminal $e$ of receptacle 3B through the corresponding conductor $t$, through the coil of electro-magnetic relay 3C, through conductors 165, 135 to the other side of converter 136, thus energizing relay 3C and closing the corresponding switches H, L.

From the foregoing description, it is apparent that the closing of switches H, L of relay 3C energizes the respective high and low pressure valve solenoids X2H and Y2L. Upon energization of solenoids X2H, Y2L, high pressure is pumped from reservoir 57 (FIGURE 12) into the right-hand end of cylinder 32 in FIGURES 1 and 12 as low pressure is pumped into the front end of cylinder 33, thus maintaining follower 44 of stylus 41 (FIGURE 3) in firm engagement with surface X-2 of template 45 while advancing stylus 41 along the "X" axis parallel to surface X-2 and moving the workpiece from right to left in FIGURES 1 and 2.

Since a perforation 6 is also registering with photocell 6A, the relay B associated with receptacle 6B is activated and actuates electromagnetic relay 6C and the head-lowering relay 205 in substantially the same manner as that described with respect to relay receptacle 3B, electromagnetic relay 3C, and solenoids X2H, Y2L. Thus, during a portion of the first movement of workpiece W from right to left in FIGURES 1 and 2, cutter 22 is gradually moving downwardly and cutting into the workpiece W so that it reaches its fully lowered position at about the same time as or shortly before stylus rod 42 (FIGURE 3) moves into engagement with the second actuator pin $p$ adjacent a medial portion of guide surface X-2 (FIGURE 4).

At this stage in the operating cycle, pin $p$ serves no useful function although it does effect momentary energization of tape advancing relay 147 as route switch 162 (FIGURE 10) moves upwardly and causes condenser 157 to discharge through the coil of relay 147. When relay 147 is thus energized, the tape advancing switch 146 energizes stepping motor 96 to impart a second step in advancement to the pattern tape 82, and switch 151 also breaks the circuit to the relay 195.

Of course, as the tape 82 is advanced this second step, it breaks the circuit to solenoids X2H, Y2L and 205, and subsequently moves another perforation 3 in tape 82 into registration with photocell 3A, to again effect energization of electromagnetic relay 3C. The energization of electromagnetic relay 6C is not required at this time because cutter 22 remains in lowered position until such time as relay 206 is energized.

Since the valve cores 66, 67a return to their normal neutral position upon deenergization of the respective solenoids X2H, Y2L, the energization of electromagnetic relay 3C effected upon the second step of advancement in tape 82 reactivates valve operating solenoid Y2L in the manner heretofore described, thus urging follower 44 of stylus 41 (FIGURE 3) against surface X-2 of template 45 (FIGURE 4). However, since the circuit to relay 195 of delay mechanism 153 was temporarily broken by the momentary opening and then closing of switch 151 of relay 147 (FIGURE 9), the energization of valve operating solenoid X2H is delayed for a predetermined interval following energization of valve operating solenoid Y2L, during the course of which delay mechanism 153 operates in the manner heretofore described. Upon completion of the last-mentioned delay interval, it is apparent that right to left movement is again imparted to workpiece W and stylus 41 (FIGURES 1 and 2) in the direction represented by the lowermost row of arrows adjacent surface X-2 in FIGURE 4.

The control circuit operates in substantially the manner heretofore described upon stylus rod 42 (FIGURE 3) subsequently moving into engagement with actuator pin $q$ (FIGURE 4) to stop the flow of fluid pressure to cylinders 32, 33 as tape 82 is advanced a third step and delay 195 is momentarily deenergized. Template 45 (FIGURE 4) then calls for a forward movement to be imparted to workpiece W and stylus 41 along the "Y" axis at relatively high pressure while follower 44 is held against guide surface Y-1 under relatively low pressure. Accordingly, upon completion of the third step in advancement of pattern tape 82, a perforation 4 moves into registration with photocell 4A and the circuit is thus completed through the relay B connected to receptacle 4B and thus through relay 4C to first energize valve operating solenoid X2L and, at a predetermined interval thereafter, to energize valve operating solenoid Y1H.

Upon a fourth step in advancement being imparted to tape 82 as a result of the engagement of stylus rod 42 with pin $r$ (FIGURE 4), a perforation 1 in tape 82 registers with photocell 1A to actuate valve operating solenoid Y1L and, at a predetermined interval thereafter, to energize solenoid operating valve X1H so the follower 44 of stylus 41 (FIGURE 3) is maintained in engagement with guide surface X-1 (FIGURE 4) under relatively light pressure as stylus 41 and workpiece W are advanced from left to right in FIGURES 1 and 2 under relatively heavy pressure until stylus rod 42 is engaged and elevated by actuator pin $s$ and a fifth advancing step is imparted to tape 82.

Upon completion of this fifth advancing step of tape 82, a perforation 2 registers with photocell 2A to first energize valve operating solenoid X1L and, at a predetermined interval thereafter to energize valve operating solenoid Y2H. It is apparent that this causes follower 44 of stylus 41 to bear against guide surface Y-2 (FIGURE 4) under relatively light pressure as rearward movement, along the "Y" axis, is imparted to workpiece W and stylus 41 under relatively high or heavy pressure until stylus rod 42 (FIGURE 3) again moves into engagement with actuator pin $o$. In this instance, since cutter 22 gradually moved downwardly into the workpiece W during the first portion of its movement along the "X" axis from right to life in FIGURE 1, a portion of the workpiece has not been cut away by the stylus 41 first returns to engage the actuator pin $o$ during the corresponding cycle. Accordingly, upon engaging the pin $o$, the first time following initiation of the corresponding cycle, the corresponding advancement of the tape 82 effected thereby again moves a perforation 3 in tape 82 into registration with photocell 3A to effect successive energization of valve operating solenoids Y2L, X2H in the manner heretofore described with respect to pin $p$ (FIGURE 4).

Thus, with the cutter 42 in fully lowered position, the remaining previously uncut portion of the workpiece intended to be cut is cut away by the time stylus rod 42 has moved along the path represented by the middle row of arrows adjacent surface X-2 in FIGURE 4 and engages and is elevated by pin p the second time in this particular cycle. With the advancement of the tape 82 effected by the second engagement of stylus rod 42 with pin p, a hole or perforation 5 in tape 82 registers with photocell 5A, thus energizing valve operating solenoids Y2L, X1H in succession so as to return the stylus 41 from left to right in FIGURES 1 and 2 and in the direction indicated by the uppermost row of arrows in FIGURE 4, to again engage the pin o.

Here again, pin o effects an eighth step in advancement to pattern tape 82 to deenergize solenoids Y2L, X1H, thereby arresting the flow of fluid into cylinders 32, 33. Upon completion of this eighth step of advancement of pattern tape 82, a perforation 7 registers with photocell 7A so that, although the stylus 41 and workpiece W remain in a fixed position, the toolhead 20 is moved upwardly along the "Z" axis to be completely withdrawn from the workpiece W and to inoperative position by energization of the tool-head-lifting relay 206 of FIGURE 10. Also, upon completion of the eighth step in advancement of pattern tape 82, a perforation 8 will have moved into registration with photocell 8A with the result that both of the photocells 7A, 8A are excited simultaneously and cause substantially simultaneous energization of the coils of electromagnetic relays 7C, 8C.

Although energization of relay 8C effects another advancement in the stepwise movement of pattern tape 82, the short pulse of electrical energy transmitted to relay 7C and thus to the head-lifting relay 206 is sufficient to close the switch of relay 206 and cause toolhead 20 to be returned to elevated position in a conventional manner. It should be noted that, each time an electromagnetic relay 8C is energized, switch S is closed and causes current to flow from one side of high voltage secondary winding 142 (FIGURE 9) through conductors 155, 182, and 156, through the coil of tape advancing relay 147 to the other side of secondary winding 142. This momentarily energizes relay 147 to close tape advancing switch 146 until tape 82 is advanced. During the course of the latter advancement of tape 82, the circuits to electromagnetic relays 7C and 8C are broken, thus returning switches Q, S to the open position and permitting switch T to return to closed position.

Since pattern tape 82 is endless, in order to return pattern tape 82 to the "home" position in which tape 82 occupies a position immediately preceding that which it must occupy upon the next step being effected therein at the start of a succeeding cycle in the operation of the control system, tape 82 is provided with a plurality of successive perforations 8 therein to the extent required to return the tape to the "home" position, it being apparent that electromagnetic relay 8C is energized each time a perforation 8 moves into registration with photocell 8A. Since there is no perforation in tape 82 at the final zone to which it is moved by actuation of relay 8C, it is apparent that tape 82 will stop in this position and the only components of the control system which will then remain energized are lamps 95, 125, converter 136 of FIGURE 9 and the coil of delay relay 195 of FIGURE 10 until a succeeding cycle is initiated in the manner heretofore described.

Switch T associated with electromagnetic relay 8C is provided as a precautionary measure only to prevent damage to the valves 52, 53, 52a, 53a and the fluid system controlling the raising and lowering of toolhead 20 along the "Z" axis in the event of rupture or breakage of pattern tape 82. Otherwise, in the event the pattern tape 82 should break for any reason, or if an attempt was made to replace pattern tape 82 with another tape having a different arrangement of perforations therein, for example, it is apparent that all the photocells 1A-8A would be exposed to illumination by lamp 95 if switch 123 then occupied closed position. This would effect energization of all the electromagnetic relays 1C-8C. In this event, since safety switch T would be opened simultaneously with the closing of all the switches H, L, P, Q (FIGURE 10), the cores 66, 67, 66a, 67a of all the valves for controlling the flow of fluid to cylinders 32, 33 would remain in or return to neutral position, as the case may be. Further, tool-head-lowering relay 205 will remain deenergized while tool-head-raising relay 206 will be energized to raise the toolhead 20 to inoperative position.

*Initial operation of worktable following lowering of workhead*

As heretofore stated, initial movement of worktable 23 may be delayed until workhead 20 reaches fully lowered position by opening switch M (FIGURE 10) and closing switch V before closing start switch 124 (FIGURE 9). The perforations in tape 82 also would be arranged differently from that described heretofore, and pin p (FIGURE 4) may be omitted.

To start each cycle, switch 124 is closed momentarily to advance tape 82 one step, whereupon a perforation 6 registers with photocell 6A to actuate head-lowering relays 6C, 205 (FIGURE 10) and effect downward movement to workhead 20. Since stylus rod 42 is on pin o, condenser 157 was previously discharged. However, during downward movement of workhead 20, member 207 closes switch N momentarily to charge condenser 157. Thus, when workhead reaches lowermost position, the closing of switch J by member 207 discharges condenser 157 through relay 147 (FIGURE 9) to advance tape 82 a second step.

On this second step of tape 82, a perforation 3 registers with photocell 3A, thus energizing relay 3C to effect successive energization of the respective low and high pressure valve solenoids Y2L and X2H. Since switch J (FIGURE 10) is held in closed position, the operation of the apparatus then may proceed in the same manner as set forth earlier with respect to successive movements of stylus rod 42 into engagement with pins q through s (FIGURE 4) in the first condition in which switch M is closed and switch V is open.

However, under the present condition, upon stylus rod 42 engaging pin o at the end of a cutting cycle, the corresponding advancement of tape 82 brings only a perforation 7 into operative position to cause energization of head-raising relays 7C, 206 (FIGURE 10). As workhead 20 then moves upwardly (with stylus rod 42 in raised position, switch M open and switch V closed), switch N is closed momentarily to charge condenser 157, and then switch K is closed to discharge condenser 157 through relay 147 (FIGURE 9) as workhead 20 reaches fully raised position.

It is thus seen that tape 82 is advanced another step upon the return of workhead 20 to raised position. Upon the latter advancement of tape 82, a perforation 8 registers with photocell 8A and then the tape is returned to "home" position in the manner heretofore described to complete the corresponding cycle in the operation of the apparatus.

From the foregoing description, it is apparent that switch M may be omitted or remain open under both operating conditions described heretofore since, under the first condition (in which worktable 23 and workhead 20 initially start movement substantially simultaneously) one or the other of the switches J, K will occupy closed position whenever route switch 162 is moved to raised position by any one of the actuator pins o-s. Even though switch K may open at about the same time that stylus rod 42 is moved off pin o, and switch J is closed thereafter, condenser 157 will not be discharged, to advance tape 82, until switch 162 is again raised.

Under the second condition (in which movement of worktable 23 is initially delayed until workhead 20 reaches lowermost operative position), as long as conductor 156a is interrupted or switch M is open between the points at which switches J, K are connected to conductor 156a, condenser 157 may be discharged at the required times. In this regard, it should be noted that route switch 162 occupies raised position whenever workhead moves downwardly or upwardly under the second condition, and one or the other of the switches J, K occupies closed position whenever route switch 162 is moved from lowered to raised position.

Second embodiment of signal amplifier

Figure 13:
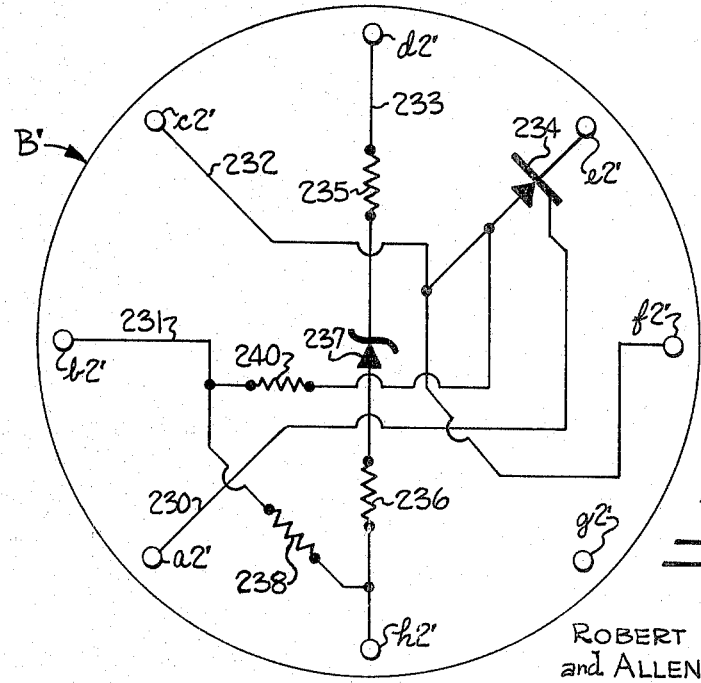
FIGURE 13 is a schematic plan view of a second form of solid state integrated relay module.

The circuit shown in FIGURE 14 is arranged to accommodate photocells or photoswitches 1A′–8A′ of the photoconductive type in which the photosensitive material, when subjected to light, becomes an electrical conductor. Accordingly, a second form of modular solid state integrated relay B′ (FIGURE 13) is used with the circuit of FIGURE 14 instead of the modular relay B of FIGURE 11.

It is to be noted that the circuits of FIGURES 9 and 14 are identical in many respects, as will be explained hereinafter, so that relatively few alternations are required in either circuit to change it to the form of the other. Therefore, those parts of the circuit of FIGURE 14 which may be identical to parts of the circuit of FIGURE 9, and including those conductors which extend to FIGURE 10, will bear the same reference characters in both FIGURES 9 and 14. Further, any parts of the circuit of FIGURE 14 which are arranged similar to parts of the circuit of FIGURE 9, but differ from the parts of FIGURE 9, will bear the same reference characters with the prime notation added and will not be described again except as to the extent necessary to a clear understanding of the same.

The circuit of FIGURE 14 differs from that of FIGURE 9 in that the A.C.–D.C. converter 136 may be omitted and conductors 131a, 135 are connected to high voltage conductors 154, 155. Further, the terminals c, f of each relay receptacle 1B–8B may be interconnected by a conductor k, and a conductor 225a connects each terminal b to a separate terminal of a common receptacle 226a in FIGURE 14.

A connector 226, adapted to be connected to receptacle 226a, has conductors 225 which are connected to photoswitches 1A′–8A′. A second form of solid state integrated relay B′ (FIGURE 13) is plugged into each receptacle 1B–8B of FIGURE 14. In all other respects, the circuit of FIGURE 14 may be identical to that of FIGURE 9 and a further description of the circuit of FIGURE 14 is thus deemed unnecessary.

The solid state relay B′ amplifies the pulse or signal from the corresponding photoswitch 1A′–8A′ to cause relay B′ to conduct electricity from conductor 135 to conductors 127a and t in FIGURE 14. Terminals o rpins a2′–h2′ (FIGURE 13) connect with respective terminals a–h of each receptacle 1B–8B in FIGURE 14. Pins a2′, b2′, c2′, d2′ have respective conductors 230–233 connected thereto. Conductor 230 is connected to the gate or control element of a silicon controlled rectifier 234 whose cathode and anode are connected to pin e2′ and conductor 232, respectively.

Conductor 232 extends from pin c2′ to pin f2′. Interposed in conductor 233 are two resistors 235, 236 straddling a suppressor 237, conductor 233 also being connected to pin h2′. Elements 235, 236, 237 are provided to suppress transients. Conductor 231 has a resistor 238 therein and is connected to conductor 233 at a point between resistor 236 and pin h2′. Opposed ends of a resistor 240 are connected to the anode of silicon rectifier 234 and to conductor 231 at a point between resistor 238 and pin b2′.

In operation, when a second form of solid state relay B′ is connected to each receptacle 1B–8B of FIGURE 14, resistor 240 serves as a voltage divider between pins h2′, f2′ (FIGURE 13) to which opposite sides of high voltage winding 142 are connected by respective conductors 154, 131a and 155, 135. Thus, a low voltage alternating current is produced to pin b2′ so that, when a photoswitch 1A′–8A′ conducts, current flows from pin a2′ of the corresponding relay B′ to the cathode of rectifier 234. The circuit of relay B′ is such that current flows through rectifier 234 only on the positive side of the alternating current sine wave, thus producing a pulsating direct current across pins e2′, h2′ to activate the corresponding lamp 126 of FIGURE 14 and the corresponding electromagnetic solenoid 1C–8C of FIGURE 10. The operation of the control system is, otherwise, the same regardless of whether the circuit of FIGURE 9 or FIGURE 14 is used with that of FIGURE 10.

It is apparent that, if the converter 136 of FIGURE 9 is used with the circuit of FIGURE 14, the operating voltage rating of electromagnetic relays 1C–8C (FIGURE 10) need not be changed. Otherwise, when using the circuit of FIGURE 14, high voltage relays 1C–8C would be used.

Other machine arrangements

As heretofore stated, the machine with which the present invention is used may be of the type in which the tool or cutter and the template may be moved relative to a fixed worktable and a fixed stylus. Such an arrangement may be effected, for example, by suitably connecting fluid motors 30, 31 of FIGURES 1 and 2 to the tool head 20 and the template 45 instead of to worktable 23 and composite stylus 41.

In FIGURE 15, still another machine arrangement is shown in which the stylus and the tool occupy fixed positions, and the template and worktable are moved relative to the stylus and the tool. Thus, those parts shown in FIGURE 15 which correspond substantially to parts shown in FIGURES 1 and 2 shall bear the same reference characters with the letter "c" added.

In FIGURE 15 it will be noted that the composite stylus 41c is fixed to and projects upwardly from base 25c in axial alignment with chuck 21c and worktool 22c of toolhead 20c. The follower 44c on the upper portion of stylus 41c is positioned in profile recess 46c of a template 45c suitably secured to the lower surface of worktable 23c directly below workpiece Wc. The frame 24c has an opening 248 therethrough sufficiently large to accommodate template 45c and permit template 45c and worktable 23c to move forwardly and rearwardly relative to frame 24c.

Fluid motors, not shown, but corresponding to fluid motors 30, 31 of FIGURES 1 and 2, impart the desired force to worktable 23c and frame 24c in forward and rearward and lateral directions. It is apparent that the fluid motor or motors which apply forward and rearward force to frame 24c would be positioned out of alignment with stylus 41c. An illustration and further description of the fluid motors associated with the machine of FIGURE 15 is deemed unnecessary, since they may be arranged in a manner similar to that of FIGURES 1 and 2.

In the drawings and specification there have been set forth preferred embodiments of the invention and, although specific terms are employed, they are used in a generic and descriptive sense only and not for purposes of limitation, the scope of the invention being defined in the claims.

We claim:

1. In a machine tool having a cutter member, a worktable member for supporting workpieces to be operated upon by the cutter member, a template having successive guide surfaces extending at different relative angles, follower means adapted to engage said guide surfaces, and means connecting said template in fixed relation with one of said members and connecting said follower means in fixed relation with the other of said members; the combination of a pattern device, spaced actuator means adjacent said guide surfaces adapted for successive registration with said follower means, means responsive to successive registration of said actuator means and said follower means and operatively connected to said pattern device for advancing the same, means responsive to said pattern device for effecting relative movement between said members and between said template and said follower means parallel to corresponding successive guide surfaces and to thereby effect successive registration of said actuator means and said follower means, and said last-named responsive means being operable to maintain said follower means and each successive guide surface in yieldable pressure interengagement during parallel movement therebetween.

2. In a machine tool having a cutter, a worktable for supporting workpieces to be operated upon by the cutter, a template member having guide surfaces extending at various relative angles, a follower member adapted to engage said guide surfaces and means connecting said cutter in fixed relation with one of said members and connecting said worktable in fixed relation with the other of said members; the combination of an actuator member adjacent the juncture of certain adjacent pairs of said guide surfaces, said follower member being adapted for successive registration with said actuator members, a pattern device, means responsive to each registration of said follower member with an actuator member for advancing said pattern device, means responsive to said pattern device for effecting relative movement between said members and between said cutter and said worktable parallel to corresponding successive guide surfaces to cause said follower member to register with successive actuator members, and said means responsive to said pattern device being operable to maintain said follower member and each successive guide surface in yieldable pressure interengagement during parallel relative movement therebetween with the force of such pressure interengagement being less than the force effecting such relative movement.

3. In a machine tool having a cutter, a worktable for supporting workpieces to be operated upon by the cutter, a template member having conjoint guide surfaces extending at various relative angles, a stylus member adapted to engage said guide surfaces and means connecting said cutter in fixed relation with one of said members and connecting said worktable in fixed relation with the other of said members; the combination of an actuator adjacent the juncture of each adjacent pair of said guide surfaces and adapted to be engaged one at a time by said stylus member, a pattern device, means responsive to each engagement of said stylus member with an actuator for advancing said pattern device, means responsive to said pattern device for effecting relative movement between said members and between said cutter and said worktable parallel to corresponding successive guide surfaces to cause said stylus member to engage successive actuators, and said means responsive to said pattern device being operable to maintain said stylus member and each successive guide surface in yieldable pressure interengagement during parallel relative movement therebetween with the force of such pressure interengagement being less than the force effecting such relative movement.

4. A system for controlling relative movement between a cutter and the worktable of a machine tool, such as a router machine, for cutting irregularly-shaped articles, said machine tool including first and second cooperating members mounted for relative movement in fixed relation to the worktable and the cutter, respectively, one of said members being a template and the other of said members being a stylus; said system comprising
first differential force applying means to effect relative movement between the cutter and the worktable in a given plane substantially along a first axis,
second differential force applying means to effect relative movement between the cutter and the worktable in said plane substantially along a second axis substantially perpendicular to said first axis,
pattern control means responsive to said stylus and operably connected to said force applying means for controlling the force of said force applying means and being operable to cause said first and second force applying means to apply relatively high and low forces, respectively, when said template calls for relative movement between the cutter and the worktable substantially along said first axis, and being operable to cause said first and second force applying means to apply relatively low and high forces, respectively, when said template calls for relative movement between the cutter and the worktable substantially along said second axis with the application of the low force in each instance being such as to maintain interengagement between the stylus and the template.

5. Apparatus for controlling relative movement between a cutting element and a workpiece element utilizing a template member and a stylus member, one of said elements being movable in fixed relation with one of said members, the other element being fixed with respect to the other member, and wherein the template member has at least two adjacent relatively angularly disposed guide surfaces engageable by the stylus member; said apparatus comprising
first means maintaining the stylus member and one of said surfaces on said template member in contacting interengagement and including means applying a relatively light yielding pressure to one of the members in a direction toward the other of the members,
second means operably connected to said last-named one member for moving the same under relatively high yielding pressure in a direction parallel to said one surface and toward the other of said surfaces until said last-named one member occupies a position in close proximity to said other surface,
said second means then being operable to apply a relatively light yielding pressure to said last-named one member in a direction such as to maintain said stylus member and said other surface in contacting interengagement, and
said first means being operable to move said last-named one member under relatively high yielding pressure in a direction parallel to said other surface and away from said one surface whenever said second means is maintaining said stylus member and said other surface in contacting interengagement.

6. A control system for moving the worktable of a machine tool, such as a router machine, and having a cutter for cutting irregularly-shaped articles thereon and utilizing first and second members, one of which members is a template and the other of which is a stylus, said first member being movable synchronously with the worktable and said second member occupying a fixed position relative to the cutter; said control system comprising
first fluid pressure means operable to move the worktable and first member along an X axis,
second fluid pressure means operable to move the worktable and first member along a Y axis substantially normal to said X axis,
pattern controlled means operable for introducing fluid at high pressure into said first fluid pressure means whenever the template calls for movement of the worktable substantially along said X axis while introducing fluid at a lower pressure into said second fluid pressure means such as to force the first member against the second member, and
said pattern controlled means being operable also to introduce fluid at high pressure into said second fluid pressure means whenever the template calls for movement of the worktable substantially along said Y axis while introducing fluid at lower pressure into said first fluid pressure means such as to still force the first member against the second member.

7. A control system for moving the worktable of a machine tool, such as a router machine, and having a cutter for cutting irregularly-shaped articles thereon and utilizing first and second members, one of which members is a template and the other of which is a stylus, said first member being movable synchronously with the worktable and said second member occupying a fixed position relative to the cutter; said control system comprising first fluid pressure means operable to move the worktable and first member along an X axis, second fluid pressure means operable to move the worktable and first member along a Y axis substantially normal to said X axis, pattern controlled means operably connected to said fluid pressure means and operable for introducing fluid from a high pressure source into said first fluid pressure means whenever the template calls for movement of the worktable substantially along said X axis while introducing fluid from a lower pressure source independent of said high pressure source and into said second fluid pressure means such as to force the first member against the second member, and said pattern controlled means being operable also to introduce fluid from said high pressure source into said second fluid pressure means whenever the template calls for movement of the worktable substantially along said Y axis while introducing fluid from said lower pressure source into said first fluid pressure means such as to still force the first member against the second member.

8. Apparatus as claimed in claim 7, including means interposed in said patttern controlled means and being operable to delay the introduction of fluid from said high pressure source into each fluid pressure means until after fluid has been introduced to the other corresponding fluid pressure means.

9. A control system for cyclically moving the worktable of a machine tool, such as a router machine, and having a cutter for cutting an irregularly-shaped article on said worktable and utilizing first and second members, one of which members is a template and the other of which is a stylus, said first member being movable synchronously with the worktable and said second member occupying a fixed position relative to the cutter; said control system comprising first fluid pressure means operable to move the worktable and first member along an X axis, second fluid pressure means operable to move the worktable and first member along a Y axis normal to, and in substantially the same plane as, said X axis, a third means for gradually moving said cutter from a normal position spaced from the article along a Z axis substantially perpendicular to said X and Y axes and to an active position within the article, pattern control means operable for introducing fluid at high pressure into said first fluid pressure means whenever the template calls for movement of the worktable substantially along said X axis while introducing fluid at lower pressure into said second fluid pressure means such as to force the first member against the second member, said pattern control means being operable also to introduce fluid at high pressure into said second fluid pressure means whenever the template calls for movement of the worktable substantially along said Y axis while introducing fluid at lower pressure into said first fluid pressure means such as to still force the first member against the second member, and pattern control means for operating said third means at initiation of each successive cycle of said first and second fluid pressure means.

10. A tape controlled system for programming relative movement between a tool element and a worktable element wherein first and second cooperating members are mounted for relative movement in fixed relation to the worktable element and the tool element respectively, one of said members being a template having thereon guide surfaces extending in different directions in a common plane, and the other of said members being a stylus, first and second fluid operated means operatively connected to one of said elements and being operable to apply force to said one element and said first member in a first direction and a second direction respectively, with such directions being in substantially right-angular relation to each other, a tape having a plurality of openings therethrough, a tape reader having a plurality of photoelectric cells excitable by light passing through corresponding tape openings, normally closed electrically operable separate first valve means connecting each of said fluid operated means to a source of relatively high pressure fluid, normally closed electrically operable separate second valve means connecting each of said fluid operated means to a source of relatively low pressure fluid, relay means in an electrical circuit from each of certain of said cells to certain of said first and second valve means and being arranged so that, upon excitation of a corresponding cell, the first valve means of one fluid operated means and the second valve means of the other fluid operated means are opened whereby one of the fluid operated means applies a relatively heavy force to said one element in one direction and the other fluid operated means applies relatively light force to said one element in a direction substantially at a right angle to said last-named one direction, and means operatively connecting said members to said tape and being responsive to each of certain successive relative movements between said elements and between said members for imparting a stepwise advancement to said tape.

11. A system according to claim 10, wherein said relay means includes a low voltage solid state integrated relay having means for effecting flow of high voltage to the corresponding valve means upon excitation of the corresponding photoelectric cell.

12. A system acording to claim 10, including delay means interposed in the electrical circuit and operable independently of said second valve means for delaying the opening of the corresponding first valve means for a given interval following the opening of the second valve means.

13. A system according to claim 12, including means responsive to the termination of each of certain successive relative movements between said elements for momentarily deactivating said delay means.

14. A tape controlled system for programming relative movement between a cutting tool element and a worktable element adapted to support a workpiece thereon, wherein first and second cooperating members are mounted for relative movement in a common plane and in fixed relation to the worktable element and the tool element respectively, one of said members being a template having thereon guide surfaces extending in different directions in a common plane, and the other of said members being a stylus, said template having a plurality of spaced actuators, certain of which are adjacent the juncture of guide surfaces of substantially different directions in said plane, and said actuators being engageable by said stylus, first and second fluid operated means operatively connected to one of said elements and being operable to apply force to said one element and said first member in a first direction and a second direction respectively, such directions being in substantially right-angular relation to each other, a tape having a plurality of openings therethrough, means for advancing said tape in a stepwise manner, a tape reader having a plurality of photoelectric cells excitable by light passing through corresponding tape openings, normally closed electrically operable separate first valve means connecting each of said fluid operated means to a source of relatively high pressure fluid, normally closed electrically operable separate second valve means connecting each of said fluid operated means to a source of relatively low pressure fluid, relay means in an electrical circuit from each of certain of said cells to said first and second valve means and being arranged so that, upon excitation of a corresponding cell, the first valve means of one fluid operated means and the second valve means of the other fluid operated means are opened whereby one of the fluid operated means applies a relatively heavy force to said one element in one direction and the other fluid operated means applies relatively light force to said one element in a direction substantially at a right angle to said last-named one direction, and means operatively connecting said stylus to said tape advancing means and being responsive to engagement of said stylus with each of certain successive actuators for imparting a stepwise advancement to said tape.

15. A system according to claim 14, including normally inactive electrically operable means for moving said tool element from a given location toward the worktable element, additional relay means in an electrical circuit operatively connecting another of said cells to said moving means for the tool element and being responsive to excitation of said other cell to activate said moving means.

16. A system according to claim 15, wherein said moving means causes said tool element to initially enter the workpiece gradually to a predetermined depth as relative movement occurs between said elements and between said members in said common plane and in one direction, and said openings being so arranged in said tape as to effect a reverse relative movement between said elements to return said elements and said members to predetermined relative starting position after that portion of the workpiece is cut away which was not cut away as the tool element initially entered the workpiece and at the end of each successive cycle in the operation thereof.

17. In a machine tool having a cutter, a worktable for supporting workpieces to be operated upon by the cutter, a template member having conjoint guide surfaces extending at various relative angles, a stylus member adapted to engage said guide surfaces, an actuator adjacent the juncture of each adjacent pair of said guide surfaces and adapted to be engaged by said stylus, and means connecting said cutter in fixed relation with one of said members and connecting said worktable in fixed relation with the other of said members, the combination of a pattern device, means responsive to each engagement of said stylus with an actuator for advancing said pattern device, means responsive to said pattern device for effecting relative movement between said members and between said cutter and said worktable parallel to corresponding successive guide surfaces to cause said stylus to engage successive actuators and comprising a first motor and a second motor operable upon said worktable along two respective intersecting lines, a plurality of normally inactive relays, and means under control of said pattern device for independently activating said relays in predetermined order, and valve means operably associated with such relays for selectively directing high fluid pressure and low fluid pressure to said motors in predetermined order as corresponding relays are activated and wherein said valve means and relays are arranged so that:
(a) a first of said relays causes said valve means to direct high fluid pressure to the first motor along one of said lines in a first direction and to direct low fluid pressure to the second motor along the other said line in a second direction,
(b) a second of said relays causes said valve means to direct high pressure to the second motor along said other line in a third direction opposite to said second direction and to direct low pressure to said first motor along said one line in said first direction,
(c) a third of said relays causes said valve means to direct high pressure to said first motor in a fourth direction opposite to said first direction and to direct low pressure to said second motor in said third direction, and
(d) a fourth of said relays causes said valve means to direct high pressure to said second motor in said second direction and to direct low pressure to said first motor in said fourth direction.

18. A structure according to claim 17, wherein said cutter is normally axially spaced from a workpiece on said worktable, fluid operated means for moving said cutter into penetrating engagement with and out of engagement with said workpiece, and relay means operatively connected to said fluid operated means and responsive to said pattern device for operating said fluid operated means.

19. A structure according to claim 17, including time delay means operably associated with said relays and arranged to delay the directing of high fluid pressure effected by each relay relative to the directing of low fluid pressure by each respective relay.

20. A structure according to claim 17, wherein said pattern device comprises a pattern tape having a predetermined number of perforations in a plurality of predetermined lateral positions therein, a tape reader having a plurality of photoelectric cells adjacent said tape and which become excited upon registration of corresponding perforations therewith, said first-named relays being electromagnetic relays, said means responsive to said pattern device also including a normally inactive solid state integrated relay electrically connecting each of certain of said photoelectric cells to a separate one of said electromagnetic relays and being activated upon excitation of the corresponding photoelectric cell, and each solid state integrated relay being operable, when activated, to energize the corresponding electromagnetic relay.

21. A structure according to claim 20, wherein said pattern tape is endless and of a length substantially greater than the extent to which it is advanced during a cycle in the relative movement between said cutter and said worktable, means for advancing said pattern device independently of said each engagement of said stylus with an actuator and including an additional solid state integrated relay responsive to excitation of another of said photoelectric cells for advancing said pattern device, and there being a plurality of said perforations successively arranged in said tape for effecting excitation of said last-mentioned photoelectric cell following the completion of a cycle in the operation of the cutter and the worktable.

22. A structure according to claim 21, including safety means operatively associated with said last-named solid state integrated relay for rendering said first-named relays inoperable in the event of accidental excitation of the corresponding photoelectric cells such as would occur upon breakage of the tape.

23. A tape controlled system for programming relative movement between a tool element and a worktable element comprising
first and second fluid operated means operatively connected to one of said elements and being operable to apply force to said one element in a first direction and a second direction respectively, such directions being in substantially right-angular relation to each other,
a series of spaced actuators disposed in fixed relationship and representing the path of and changes in direction of relative movement of said elements,
a stylus,
means effecting relative movement between said stylus and said actuators in proportional relation to relative movement between the elements and such that said stylus registers with successive actuators in succession, a tape having channels of pattern control zones therealong, driving means connected to said tape and responsive to registration of said stylus with each successive actuator for advancing said tape a predetermined incremental amount, a plurality of controlling devices for controlling said fluid operated means and thereby controlling the direction of relative movement between said elements, and a tape reader for reading said control zones and being operable to transmit control pulses to corresponding controlling devices and thereby controlling the relative movement between said elements and the relative movement between said stylus and said actuators.

24. A tape controlled system for programming the advancement of a movable element along a predetermined irregular path comprising a series of spaced actuators disposed in fixed relationship and representing the path of and changes in direction of movement of said element, a stylus, means effecting relative movement between said stylus and said actuators in proportional relation to movement of the element and such that said stylus registers with successive actuators in succession, a tape having channels of pattern control zones therealong, driving means connected to said tape and responsive to registration of said stylus with each successive actuator for advancing said tape a predetermined incremental amount, controllable moving means operably connected to said element for moving said element in different directions at different times, a plurality of controlling elements for controlling said moving means and thereby controlling the direction of movement of said movable element, and a tape reader for reading said control zones and being operable to transmit control pulses to corresponding controlling elements and thereby controlling the movement of said movable element and the relative movement between said stylus and said actuators.

References Cited by the Examiner
UNITED STATES PATENTS 2,777,354 1/1957 Stickeny et al.
2,911,868 11/1959 Thomson.

WILLIAM W. DYER, JR., *Primary Examiner.*

G. A. DOST, *Assistant Examiner.*